United States Patent
Torrison

(10) Patent No.: US 10,604,168 B2
(45) Date of Patent: Mar. 31, 2020

(54) LIFTER FOR STACKED TRAYS

(71) Applicant: Mark Edward Torrison, Yuba City, CA (US)

(72) Inventor: Mark Edward Torrison, Yuba City, CA (US)

(73) Assignee: ESCALERA, INC., Yuba City, CA (US)

(*) Notice: Subject to any disclaimer, the term of this patent is extended or adjusted under 35 U.S.C. 154(b) by 106 days.

(21) Appl. No.: 16/007,710

(22) Filed: Jun. 13, 2018

(65) Prior Publication Data

US 2019/0023297 A1    Jan. 24, 2019

Related U.S. Application Data

(60) Provisional application No. 62/536,316, filed on Jul. 24, 2017.

(51) Int. Cl.
     *B62B 1/06*      (2006.01)
     *B62B 1/14*      (2006.01)
     *B66F 9/18*      (2006.01)

(52) U.S. Cl.
     CPC ............... *B62B 1/06* (2013.01); *B62B 1/142* (2013.01); *B66F 9/183* (2013.01); *B62B 2202/12* (2013.01); *B62B 2203/10* (2013.01); *B62B 2203/70* (2013.01)

(58) Field of Classification Search
     CPC ....... B62B 1/06; B62B 1/142; B62B 2202/12; B62B 2203/10; B62B 2203/70; B62B 3/04; B62B 3/0637; B62B 3/0643; B66F 9/183; B66F 9/188

USPC .......... 414/445, 450, 452, 490, 623
See application file for complete search history.

(56) References Cited

U.S. PATENT DOCUMENTS

| | | | | |
|---|---|---|---|---|
| 1,971,952 | A * | 8/1934 | Townsend | B62B 1/14 414/451 |
| 2,292,234 | A * | 8/1942 | Malo | B62B 1/14 414/445 |
| 2,536,151 | A * | 1/1951 | Backofen | B66F 9/183 414/621 |
| 3,084,820 | A * | 4/1963 | Malo | B62B 1/142 414/445 |

(Continued)

FOREIGN PATENT DOCUMENTS

KR      100570742 B1    4/2006

*Primary Examiner* — James Keenan
(74) *Attorney, Agent, or Firm* — Richard C. Litman; Nath, Goldberg & Meyer

(57) ABSTRACT

The lifter for stacked trays is a motorized lifting device for stacked trays, such as bread trays, and includes a substantially U-shaped base and a vertical frame. A moveable frame assembly is slidably mounted on the vertical frame. The moveable frame assembly includes a horizontal frame member and a pair of engaging swing arms. Rear ends of the engaging swing arms are respectively pivotally secured to a pair of horizontally opposed ends of the horizontal frame member. A motor selectively raises and lowers the moveable frame assembly. A pair of vertical rods are respectively mounted to the pair of engaging swing arms adjacent the rear ends thereof. When a stack of trays engage the pair of vertical rods, to rearward movement of the stack of trays causes the pair of engaging swing arms to rotate inwardly to contact the side edges of the adjacent tray in the stack.

20 Claims, 6 Drawing Sheets

(56) References Cited

U.S. PATENT DOCUMENTS

| | | | | |
|---|---|---|---|---|
| 3,410,431 | A | 11/1968 | Vik | |
| 3,499,658 | A * | 3/1970 | Fernholz | B62B 1/14 280/47.2 |
| 4,331,320 | A | 5/1982 | Naruse et al. | |
| 4,421,209 | A * | 12/1983 | Vermette | B66F 9/07559 182/129 |
| 4,685,854 | A * | 8/1987 | Bulle | B62B 1/12 280/47.24 |
| 4,737,065 | A * | 4/1988 | Ju | B62B 1/14 254/4 R |
| 4,793,623 | A * | 12/1988 | Talbot | B62B 1/142 280/47.24 |
| 5,028,085 | A | 7/1991 | Dudley, Jr. | |
| 5,161,934 | A | 11/1992 | Richardson | |
| 5,385,440 | A * | 1/1995 | Raben | B66F 9/12 414/607 |
| 5,478,196 | A | 12/1995 | Avitan et al. | |
| 6,003,917 | A | 12/1999 | Tygard | |
| 6,406,248 | B1 * | 6/2002 | McGill | B62B 3/008 280/47.2 |
| 6,543,986 | B2 | 4/2003 | Springston et al. | |
| 6,921,095 | B2 * | 7/2005 | Middleby | B62B 1/10 254/325 |
| 7,311,297 | B1 * | 12/2007 | Bradshaw | B66D 3/18 254/271 |
| 7,731,473 | B2 | 6/2010 | Yuyama et al. | |
| 7,789,611 | B2 * | 9/2010 | Wilson | B62B 3/04 280/47.15 |
| 7,913,975 | B2 | 3/2011 | Haynes | |
| 9,139,214 | B2 * | 9/2015 | Rich | B62B 3/0606 |
| 2004/0076501 | A1 * | 4/2004 | McGill | B62B 3/008 414/607 |
| 2011/0243696 | A1 * | 10/2011 | DiBenedetto | B66F 9/06 414/490 |
| 2014/0319438 | A1 * | 10/2014 | Carlson | B62B 3/02 254/2 R |

* cited by examiner

LIFTER FOR STACKED TRAYS

CROSS-REFERENCE TO RELATED APPLICATION

This application claims the benefit of U.S. Provisional Patent Application Ser. No. 62/536,316, filed on Jul. 24, 2017.

BACKGROUND

1. Field

The disclosure of the present patent application relates to motorized lifting devices, and particularly to a motorized lifter for lifting stacked trays, such as bread trays.

2. Description of the Related Art

A wide variety of powered lifting devices are used in numerous fields for lifting and moving materials over short distances. Powered lifting devices, from forklifts to motorized hand trucks, typically operate based around one common feature; i.e., a platform which is driven to selectively raise and lower. Although containers and supports, such as pallets, are often manufactured to rest on a particular type of raising and lowering platform (e.g., the forked frame of a forklift), stacks of items, such as stacked trays, present unique difficulties.

Bread trays, for example, are typically manufactured to be stacked for both ease of storage as well as ease of manual transport. Although a conventional lifting device could be used with a stack of bread trays, the bottommost tray would simply sit on the driven platform. Even if the bottom of the bottommost tray was contoured, as with a typical pallet, the only securement for the entire stack relative to the lifter would be the bottom surface of that bottommost tray sitting on the platform. For a stack of several trays, a slight misalignment of that bottommost tray could easily cause the center of gravity of the entire stack to shift beyond the area of the platform, thus causing the entire stack to tip and fall. Thus, a lifter for stacked trays solving the aforementioned problems is desired.

SUMMARY

The lifter for stacked trays is a motorized lifting device for stacked trays, such as bread trays or the like. The lifter for stacked trays includes a substantially U-shaped base, having a closed rear portion and an open front portion, and a vertical frame. The vertical frame is mounted on the closed rear portion of the substantially U-shaped base and extends upwardly therefrom. A moveable frame assembly is slidably mounted on the vertical frame. The moveable frame assembly is formed from a horizontal frame member, having a pair of horizontally opposed ends, and a pair of engaging swing arms. Each of the engaging swing arms has opposed front and rear ends, with the rear ends thereof being respectively pivotally secured to the pair of horizontally opposed ends of the horizontal frame member. Each engaging swing arm has at least one engaging member secured thereto.

A pulley is mounted on an upper end of the vertical frame, and a motor is mounted to a central portion of the vertical frame. A first end of a cable is linked to, and driven by, the motor. A second end of the cable is secured to the horizontal frame member of the moveable frame assembly, with a central portion of the cable extending over, and rotationally engaging, the pulley. The motor selectively drives the cable to selectively raise and lower the moveable frame assembly with respect to the fixed base and the fixed vertical frame.

A pair of vertical rods are respectively mounted to the pair of engaging swing arms of the moveable frame assembly adjacent the rear ends thereof. In use, a stack of trays to be lifted is inserted through the open front portion of the substantially U-shaped base and between the pair of engaging swing arms of the moveable frame assembly. When the stack of trays engage the pair of vertical rods, continued rearward movement of the stack of trays (via manual pushing or the like) causes the pair of engaging swing arms to rotate inwardly to contact the side edges of the adjacent tray in the stack. The at least one engaging member of each of the engaging swing arms releasably secures the stack of trays to the moveable frame assembly for secure lifting thereof.

These and other features of the present disclosure will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1A:
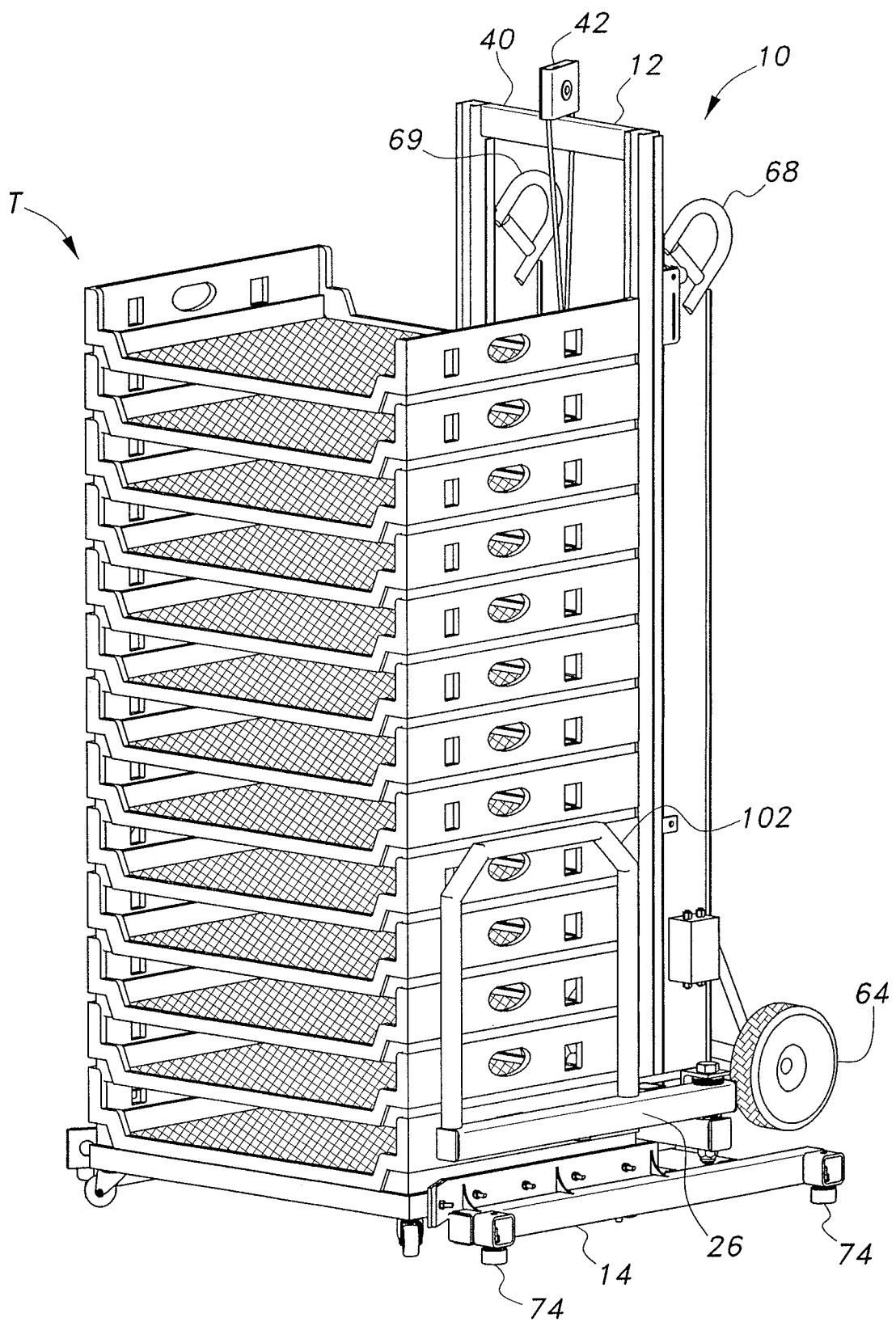
FIG. 1A is an environmental, perspective view of a lifter for stacked trays, shown in a lowered position.
Figure 1B:
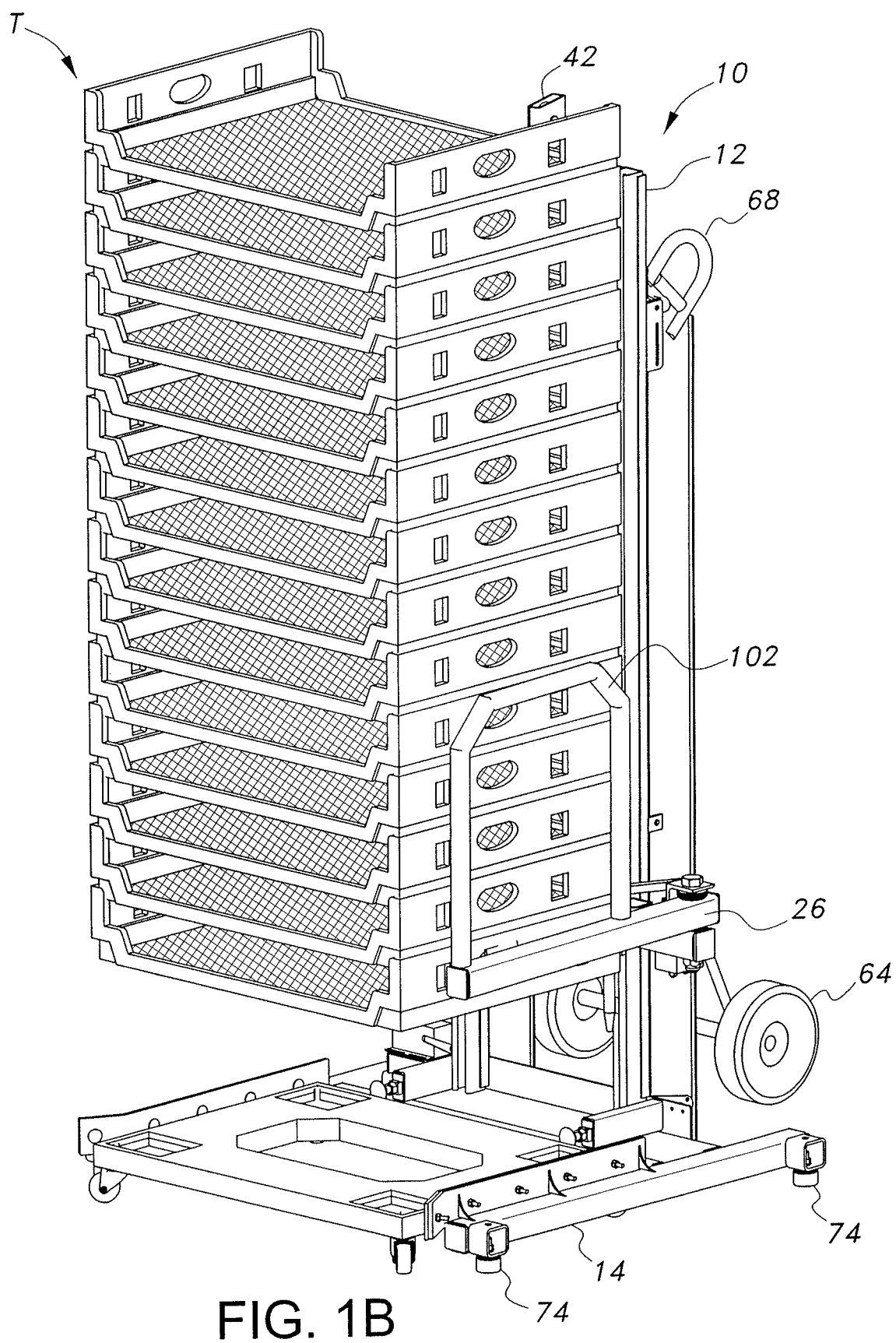
FIG. 1B is an environmental, perspective view of the lifter for stacked trays shown in a raised position.
Figure 2:
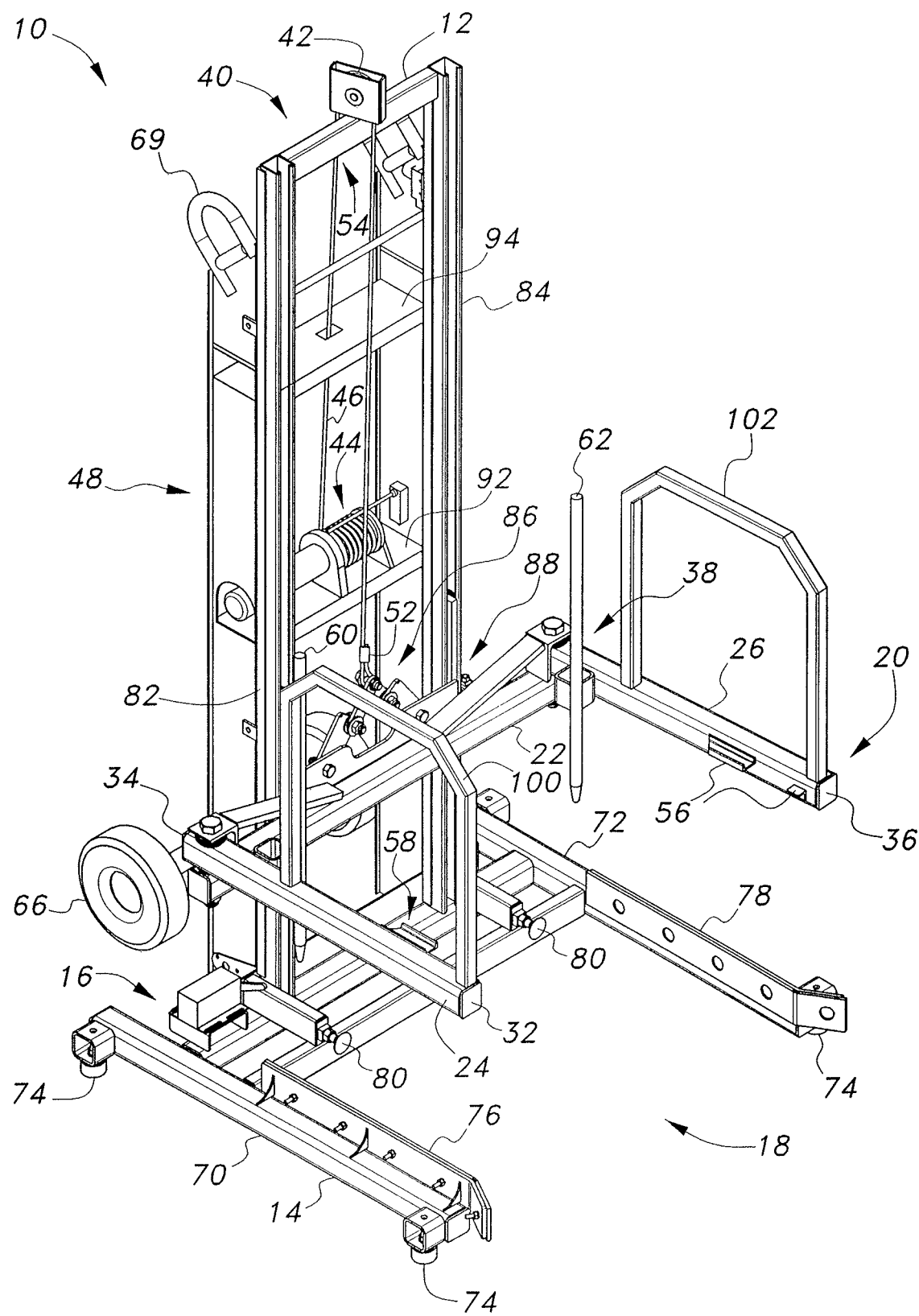
FIG. 2 is a forward perspective view of the lifter for stacked trays.
Figure 3:
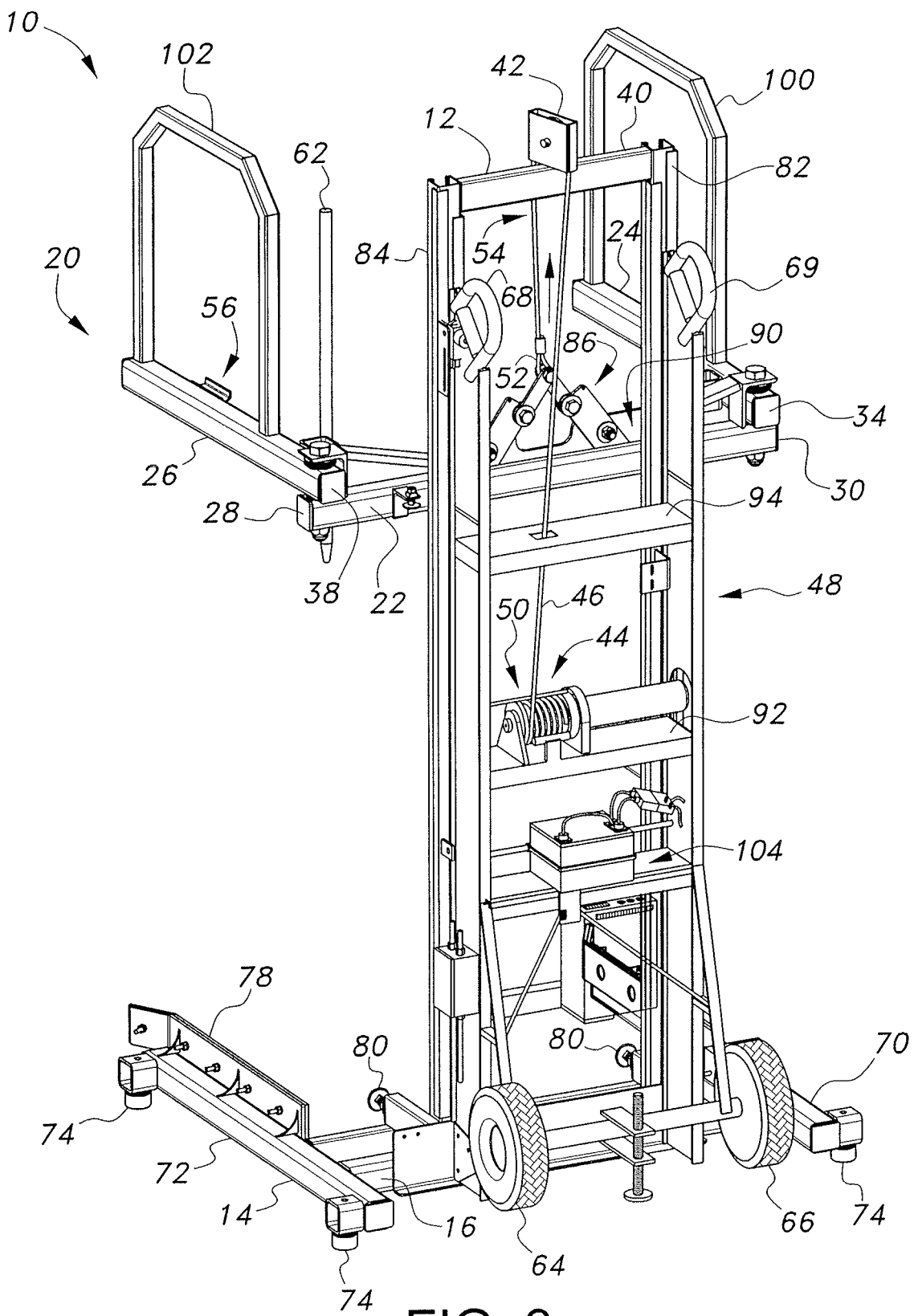
FIG. 3 is a rear perspective view of the lifter for stacked trays.

As shown in FIGS. 1A and 1B, the lifter for stacked trays 10 is a motorized lifting device for stacked trays, such as bread trays T or the like. It should be understood that the stack of bread trays T, shown in FIGS. 1A and 1B, are shown for exemplary purposes only. As best seen in FIGS. 2 and 3, the lifter for stacked trays 10 includes a substantially U-shaped base 14, having a closed rear portion 16 and an open front portion 18, and a vertical frame 12. As shown, the base 14 may include a pair of arms 70, 72 secured to the closed rear portion 16. Any desired type of feet 74 or engaging elements may be secured to the underside of base 14, as is conventionally known, in order to protect the ground or floor from damage. As will be described in greater detail below, when the stack of trays T is inserted into lifter 10, the trays T are moved inward with respect to the substantially U-shaped base 14, between the pair of arms 70, 72. Guide members 76, 78 may be respectively mounted to fixed arms 70, 72 to ensure proper positioning and alignment of the stack of trays T, as shown. One or more bumpers 80 may also be provided, as shown, for preventing the stack of trays T from moving too far into the substantially U-shaped base 14.

The vertical frame 12 is mounted on the closed rear portion 16 of the substantially U-shaped base 14 and extends upwardly therefrom. The vertical frame 12 includes a pair of side rails 82, 84 and an upper end 40, as shown. It should be understood that the overall configuration and relative dimensions of vertical frame 12 and base 14 are shown in FIGS. 1A, 1B, 2 and 3 for exemplary purposes only, and may be varied dependent upon the particular needs and desires of the user.

Figure 4A:
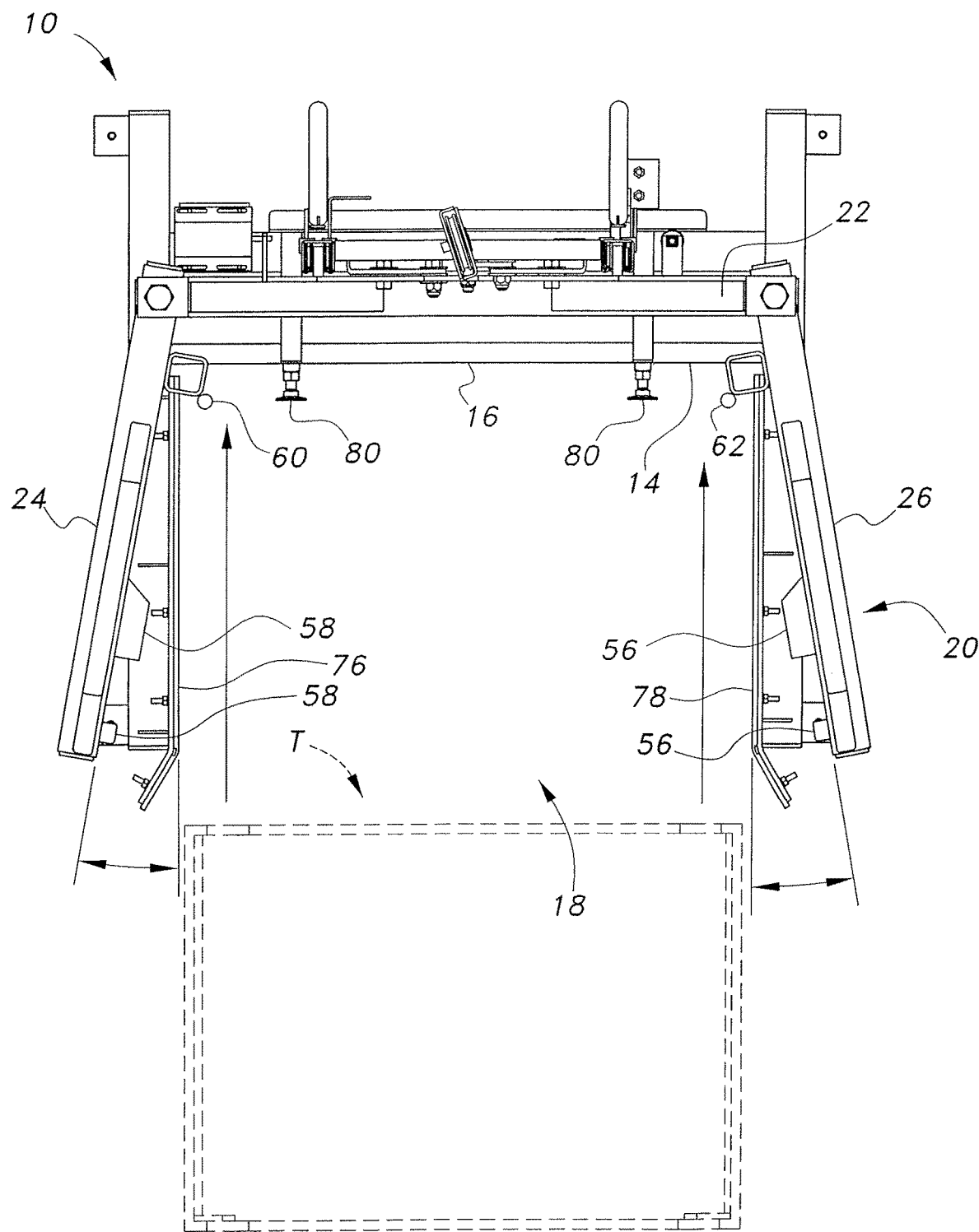
FIG. 4A is a top view of the lifter for stacked trays in a first receiving configuration.
Figure 4B:
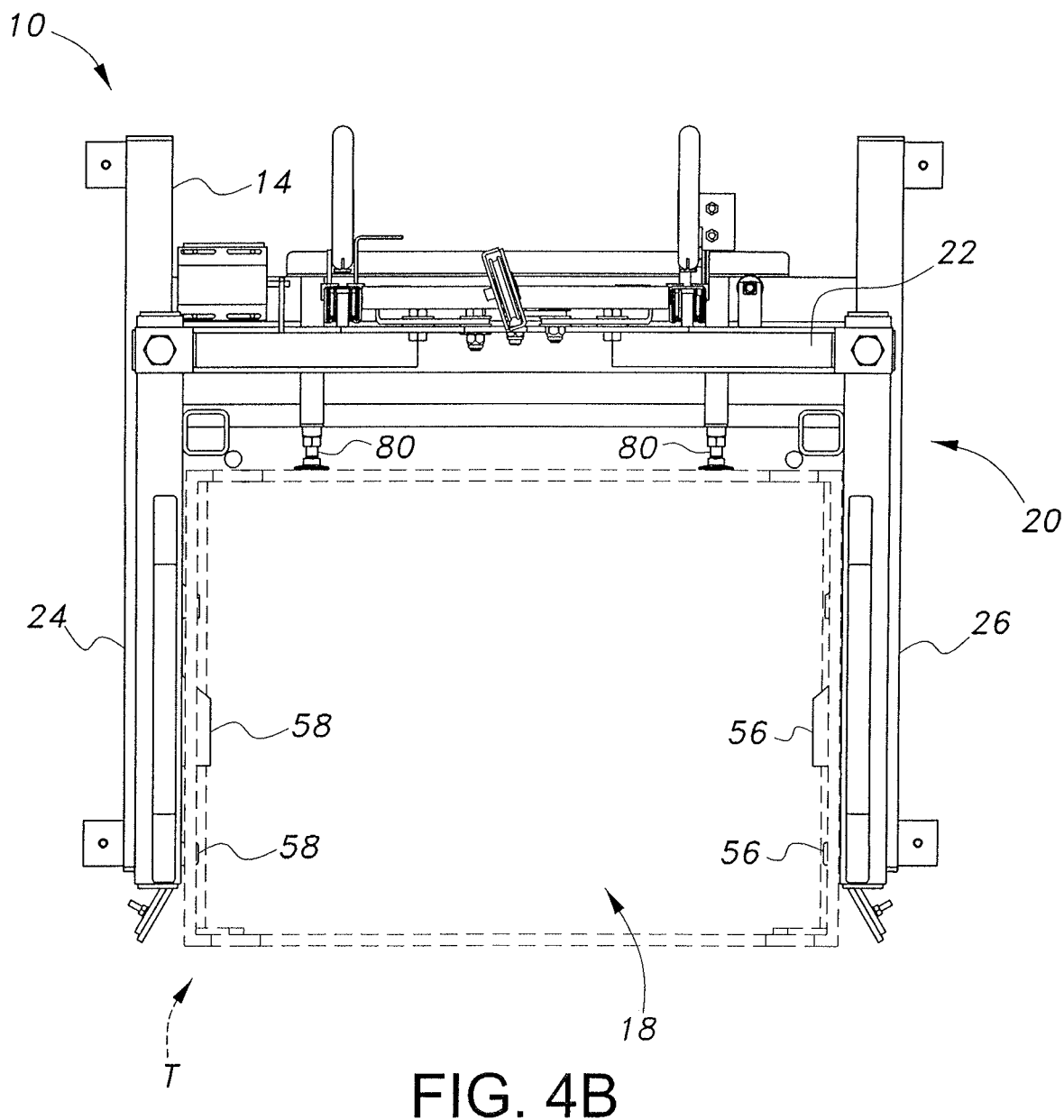
FIG. 4B is a top view of the lifter for stacked trays in a second retaining configuration.

A moveable frame assembly 20 is slidably mounted on the vertical frame 12. The moveable frame assembly 20 includes a horizontal frame member 22, having a pair of horizontally opposed ends 28, 30, and a pair of engaging swing arms 24, 26. Engaging swing arm 24 has opposed front and rear ends, 32, 34, respectively. Similarly, engaging swing arm 26 has opposed front and rear ends, 36, 38, respectively. The respective rear ends 34, 38 are respectively pivotally secured to the pair of horizontally opposed ends 28, 30 of the horizontal frame member 22, as shown. Each engaging swing arm 24, 26 has at least one engaging member 58, 56, respectively, secured thereto. For example, as best shown in FIGS. 2, 4A and 4B, each of engaging swing arms 24, 26 may have a respective pair of engaging members 58, 56, with each pair of engaging members having one engaging member positioned in a substantially central region of the corresponding swing arm, and one engaging member positioned adjacent the front end of the corresponding swing arm.

Preferably, a pivoting brake assembly 86 is mounted on the horizontal frame member 22. As horizontal frame member 22 slides upwardly and downwardly in rails 82, 84, opposed ends 88, 90 of pivoting brake assembly 86 releasably engage respective sidewalls of rails 82, 84. In the at rest position shown in FIG. 2, ends 88, 90 of pivoting brake assembly 86 rest against the sidewalls of rails 82, 84, maintaining the moveable frame assembly 20 in a secure and stable position. As the moveable frame assembly 20 is drawn upward by cable 46, as will be described in greater detail below, ends 88, 90 of pivoting brake assembly 86 are drawn inward, as shown in FIG. 3, removing contact between ends 88, 90 and rails 82, 84, thus allowing for free sliding movement of horizontal frame member 22. It should be understood that any suitable type of braking or stabilizing system may be used to provide additional stability and security to the moveable frame assembly 20.

A pulley 42 is mounted on the upper end 40 of the vertical frame 12, as shown, and a motor 44 is mounted to a central portion 48 of the vertical frame 12. Although shown as resting on a shelf 92, it should be understood that motor 44 may be mounted to vertical frame 12 in any suitable manner. It should further be understood that any suitable type of motor, drive, actuator or the like may be used to selectively drive motion of moveable frame assembly 20, and that motor 44 is shown for exemplary purposes only.

A first end 50 of a cable 46 is linked to, and driven by, the motor 44. A second end 52 of the cable 46 is secured to the horizontal frame member 22 of the moveable frame assembly 20, with a central portion 54 of cable 46 extending over, and rotationally engaging, the pulley 42. The motor 44 selectively drives the cable 46 to selectively raise and lower the moveable frame assembly 20 with respect to the fixed base 14 and the fixed vertical frame 12. A guide plate 94 or the like may be provided to prevent misalignment of the cable 46. It should be understood that motor 44 may be powered by any suitable power source, such as exemplary battery 104, and may be controlled by any suitable type of controller or user interface, e.g., foot operated switch, reversing contactor, and/or limit switches.

A pair of vertical rods 60, 62 are respectively mounted to the pair of engaging swing arms 24, 26 of the moveable frame assembly 20 adjacent their respective rear ends 34, 38. In use, as shown in FIG. 4A, a stack of trays T to be lifted is inserted through the open front portion 18 of the substantially U-shaped base 14, and between the pair of engaging swing arms 24, 26 of the moveable frame assembly 20. As shown in FIG. 4A, the pair of engaging swing arms 24, 26 are angled outwardly with respect to horizontal frame member 22 (shown to an exaggerated degree in FIG. 4A for purposes of illustration). As shown in FIGS. 4A and 4B, when the stack of trays T engage the pair of vertical rods 60, 62, continued rearward movement of the stack of trays T (via manual pushing or the like) causes the pair of engaging swing arms 24, 26 to rotate inwardly to contact the side edges of the adjacent tray in the stack. The at least one engaging member 58, 56 of each of the engaging swing arms 24, 26, respectively, releasably secures the stack of trays T to the moveable frame assembly 20 for secure lifting thereof.

As further shown in FIGS. 1A, 1B, 2 and 3, a pair of guard rails 100, 102 may be respectively secured to the engaging swing arms 24, 26 to prevent accidental horizontal shifting of the stack of trays T during lifting and lowering. Further, as best shown in FIG. 3, a pair of wheels 64, 66 are preferably mounted to the closed rear portion 16 of substantially U-shaped base 14. Using gripping handles 68, 69, which are secured to vertical frame 12, as shown, the user may tip the lifter for stacked trays 10 back and easily move the lifter 10 in a manner similar to that of a dolly or hand truck.

It is to be understood that the lifter for stacked trays is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

I claim:

1. A lifter for stacked trays, comprising:
   a substantially U-shaped base having a closed rear portion and an open front portion;
   a vertical frame mounted on the closed rear portion of said substantially U-shaped base and extending upwardly therefrom;
   a moveable frame assembly slidably mounted on said vertical frame, said moveable frame assembly comprising a horizontal frame member having a pair of horizontally opposed ends and a pair of engaging swing arms, wherein each said engaging swing arm has opposed front and rear ends, the rear ends of said engaging swing arms being respectively pivotally secured to the pair of horizontally opposed ends of the horizontal frame member, each said engaging swing arm having at least one engaging member secured thereto;
   a pulley mounted on an upper end of said vertical frame;
   a motor mounted to a central portion of said vertical frame;
   a cable having opposed first and second ends and a central portion, the first end being linked to, and driven by, said motor, the second end being attached to the horizontal frame member of said moveable frame assembly, the central portion thereof extending over and rotationally engaging said pulley, such that said motor selectively drives said cable to selectively raise and lower said moveable frame assembly; and
   a pair of vertical rods respectively mounted to the pair of engaging swing arms of said moveable frame assembly adjacent the rear ends thereof, whereby insertion of a stack of trays to be lifted into the open front portion of the substantially U-shaped base and between the pair of engaging swing arms of said moveable frame assembly causes the pair of engaging swing arms to rotate inwardly upon engagement between the stack of trays and the pair of vertical rods, the at least one engaging member of each of said engaging swing arms releasably securing the stack of trays to the moveable frame assembly for secure lifting thereof.

2. The lifter for stacked trays as recited in claim 1, further comprising at least one wheel mounted to the closed rear portion of said substantially U-shaped base.

3. The lifter for stacked trays as recited in claim 2, further comprising at least one gripping handle secured to said vertical frame.

4. The lifter for stacked trays as recited in claim 1, wherein the vertical frame further comprises a pair of side rails.

5. The lifter for stacked trays as recited in claim 4, wherein the horizontal frame member further comprises a pivoting brake assembly.

6. The lifter for stacked trays as recited in claim 5, wherein the pivoting brake assembly has a pair of horizontally opposed ends which selectively pivot to selectively engage the pair of side rails of the vertical frame.

7. The lifter for stacked trays as recited in claim 6, wherein the second end of the cable is secured to a central portion of the pivoting brake assembly.

8. The lifter for stacked trays as recited in claim 1, further comprising a pair of guard rails respectively secured to the pair of engaging swing arms of the moveable frame assembly.

9. A lifter for stacked trays, comprising:
a substantially U-shaped base having a closed rear portion and an open front portion;
a vertical frame mounted on the closed rear portion of said substantially U-shaped base and extending upwardly therefrom;
a moveable frame assembly slidably mounted on said vertical frame, said moveable frame assembly comprising a horizontal frame member having a pair of horizontally opposed ends, a pair of engaging swing arms and a pivoting brake assembly, wherein each said engaging swing arm has opposed front and rear ends, the rear ends of said engaging swing arms being respectively pivotally secured to the pair of horizontally opposed ends of the horizontal frame member, each said engaging swing arm having at least one engaging member secured thereto;
a pulley mounted on an upper end of said vertical frame;
a motor mounted to a central portion of said vertical frame;
a cable having opposed first and second ends and a central portion, the first end being linked to, and driven by, said motor, the second end being attached to the horizontal frame member of said moveable frame assembly, the central portion thereof extending over and rotationally engaging said pulley, such that said motor selectively drives said cable to selectively raise and lower said moveable frame assembly; and
a pair of vertical rods respectively mounted to the pair of engaging swing arms of said moveable frame assembly adjacent the rear ends thereof, whereby insertion of a stack of trays to be lifted into the open front portion of the substantially U-shaped base and between the pair of engaging swing arms of said moveable frame assembly causes the pair of engaging swing arms to rotate inwardly upon engagement between the stack of trays and the pair of vertical rods, the at least one engaging member of each of said engaging swing arms releasably securing the stack of trays to the moveable frame assembly for secure lifting thereof.

10. The lifter for stacked trays as recited in claim 9, further comprising at least one wheel mounted to the closed rear portion of said substantially U-shaped base.

11. The lifter for stacked trays as recited in claim 10, further comprising at least one gripping handle secured to said vertical frame.

12. The lifter for stacked trays as recited in claim 9, wherein the vertical frame further comprises a pair of side rails.

13. The lifter for stacked trays as recited in claim 12, wherein the pivoting brake assembly has a pair of horizontally opposed ends which selectively pivot to selectively engage the pair of side rails of the vertical frame.

14. The lifter for stacked trays as recited in claim 13, wherein the second end of the cable is secured to a central portion of the pivoting brake assembly.

15. The lifter for stacked trays as recited in claim 9, further comprising a pair of guard rails respectively secured to the pair of engaging swing arms of the moveable frame assembly.

16. A lifter for stacked trays, comprising:
a substantially U-shaped base having a closed rear portion and an open front portion;
a vertical frame mounted on the closed rear portion of said substantially U-shaped base and extending upwardly therefrom, the vertical frame including a pair of side rails;
a moveable frame assembly slidably mounted on said vertical frame, said moveable frame assembly comprising a horizontal frame member having a pair of horizontally opposed ends, a pair of engaging swing arms and a pivoting brake assembly, wherein each said engaging swing arm has opposed front and rear ends, the rear ends of said engaging swing arms being respectively pivotally secured to the pair of horizontally opposed ends of the horizontal frame member, each said engaging swing arm having at least one engaging member secured thereto;
a pulley mounted on an upper end of said vertical frame;
a motor mounted to a central portion of said vertical frame;
a cable having opposed first and second ends and a central portion, the first end being linked to, and driven by, said motor, the second end being attached to the horizontal frame member of said moveable frame assembly, the central portion thereof extending over and rotationally engaging said pulley, such that said motor selectively drives said cable to selectively raise and lower said moveable frame assembly; and
a pair of vertical rods respectively mounted to the pair of engaging swing arms of said moveable frame assembly adjacent the rear ends thereof, whereby insertion of a stack of trays to be lifted into the open front portion of the substantially U-shaped base and between the pair of engaging swing arms of said moveable frame assembly causes the pair of engaging swing arms to rotate inwardly upon engagement between the stack of trays and the pair of vertical rods, the at least one engaging member of each of said engaging swing arms releasably securing the stack of trays to the moveable frame assembly for secure lifting thereof.

17. The lifter for stacked trays as recited in claim 16, further comprising at least one wheel mounted to the closed rear portion of said substantially U-shaped base.

18. The lifter for stacked trays as recited in claim 17, further comprising at least one gripping handle secured to said vertical frame.

19. The lifter for stacked trays as recited in claim 16, wherein the pivoting brake assembly has a pair of horizontally opposed ends which selectively pivot to selectively engage the pair of side rails of the vertical frame.

20. The lifter for stacked trays as recited in claim 16, wherein the second end of the cable is secured to a central portion of the pivoting brake assembly.

* * * * *